(12) United States Patent
Moshe

(10) Patent No.: US 9,821,909 B2
(45) Date of Patent: Nov. 21, 2017

(54) ROTATING WING ASSEMBLIES FOR TAILSITTER AIRCRAFT

(71) Applicant: SWIFT ENGINEERING, INC., San Clemente, CA (US)

(72) Inventor: Jonathan Moshe, Tustin, CA (US)

(73) Assignee: SWIFT ENGINEERING, INC., San Clemente, CA (US)

( * ) Notice: Subject to any disclaimer, the term of this patent is extended or adjusted under 35 U.S.C. 154(b) by 0 days.

(21) Appl. No.: 15/091,456

(22) Filed: Apr. 5, 2016

(65) Prior Publication Data
US 2017/0283052 A1    Oct. 5, 2017

(51) Int. Cl.
B64C 27/22 (2006.01)
B64C 29/02 (2006.01)
B64C 3/38 (2006.01)
B64C 29/00 (2006.01)

(52) U.S. Cl.
CPC .............. B64C 29/02 (2013.01); B64C 3/38 (2013.01); B64C 27/22 (2013.01); B64C 29/0033 (2013.01)

(58) Field of Classification Search
CPC   B64C 3/38; B64C 27/22; B64C 29/02; B64C 29/0033; B64C 2201/102
See application file for complete search history.

(56) References Cited

U.S. PATENT DOCUMENTS

| 1,603,711 | A | 10/1926 | Peck et al. |
| 1,662,406 | A | 3/1928 | Thompson |
| 1,804,312 | A | 5/1931 | Brown |
| 1,928,326 | A | 9/1933 | Bratu |
| 1,951,817 | A * | 3/1934 | Blount ................ B64C 29/0033 244/102 R |
| 2,014,377 | A | 9/1935 | Fitzgerald |
| D113,019 | S | 1/1939 | Silverstein |
| 2,481,502 | A | 9/1949 | Downing |
| 2,578,578 | A | 12/1951 | Myers et al. |

(Continued)

FOREIGN PATENT DOCUMENTS

| WO | 2011066400 A1 | 6/2011 | |
| WO | WO 2016003530 A2 * | 1/2016 | ............. B64C 3/546 |

OTHER PUBLICATIONS

Advanced VTOL Technologies, "Products: Hammerhead VTOL Aircraft", http://www.avtolt.com/products/hammerhead.php, exact publication date unknown (web page last visited Mar. 22, 2016).

(Continued)

*Primary Examiner* — Philip J Bonzell
(74) *Attorney, Agent, or Firm* — Perkins Coie LLP

(57) ABSTRACT

A tailsitter aircraft includes one or more rotatable wings. The tailsitter aircraft optionally includes a fuselage from which wing supports extend. Each rotatable wing optionally includes a rotatable wing section having an inboard portion proximate to the fuselage, and an outboard portion distal from the fuselage. The rotatable wing section may be rotatably attached to the wing support and configured to rotate between a vertical flight configuration in which the inboard portion is positioned on an opposing side of the wing support relative to the outboard portion, and a horizontal flight configuration different from the vertical flight configuration. The wings may be rotated during flight to transition between horizontal and vertical flight configurations, and they may be rotated about multiple axes.

21 Claims, 8 Drawing Sheets

(56) References Cited

U.S. PATENT DOCUMENTS

| | | | |
|---|---|---|---|
| 2,621,001 A * | 12/1952 | Roman | B64C 29/0033 244/12.4 |
| 2,678,783 A | 5/1954 | Myers | |
| 3,000,593 A * | 9/1961 | Haberkorn | B64C 29/02 244/2 |
| 3,142,455 A | 7/1964 | Wilford | |
| 5,765,783 A | 6/1998 | Albion | |
| 5,782,427 A | 7/1998 | Hermach et al. | |
| 5,823,468 A | 10/1998 | Bothe et al. | |
| 5,890,441 A | 4/1999 | Swinson | |
| 6,098,927 A | 8/2000 | Gevers | |
| 6,367,738 B1 | 4/2002 | Wadleigh et al. | |
| 6,561,455 B2 | 5/2003 | Capanna et al. | |
| 6,655,631 B2 | 12/2003 | Austen-Brown et al. | |
| 8,256,704 B2 | 9/2012 | Lundgren et al. | |
| 8,434,710 B2 | 5/2013 | Hothi et al. | |
| 8,602,348 B2 | 12/2013 | Bryant et al. | |
| 9,187,174 B2 * | 11/2015 | Shaw | B64C 29/0033 |
| 9,481,457 B2 * | 11/2016 | Alber | B64C 39/024 |
| 9,550,567 B1 * | 1/2017 | Erdozain, Jr. | B64C 29/02 |
| 2002/0074452 A1 | 6/2002 | Ingram et al. | |
| 2004/0026563 A1 | 2/2004 | Moller et al. | |
| 2005/0178879 A1 | 8/2005 | Mao et al. | |
| 2009/0045295 A1 | 2/2009 | Lundgren et al. | |
| 2010/0252690 A1 | 10/2010 | Hothi et al. | |
| 2011/0042509 A1 | 2/2011 | Bevirt et al. | |
| 2011/0315806 A1 | 12/2011 | Piasecki et al. | |
| 2012/0091257 A1 | 4/2012 | Wolff et al. | |
| 2012/0261523 A1 * | 10/2012 | Shaw | B64C 27/28 244/7 R |
| 2012/0286102 A1 | 11/2012 | Sinha et al. | |
| 2013/0206921 A1 | 8/2013 | Paduano et al. | |
| 2015/0102157 A1 | 4/2015 | Godlasky | |
| 2015/0225071 A1 | 8/2015 | Tighe | |
| 2016/0311545 A1 * | 10/2016 | Parks | B64D 27/24 |
| 2016/0378120 A1 * | 12/2016 | Creasman | B64C 3/546 701/2 |

OTHER PUBLICATIONS

Boeing, Heliwing Aircraft, 1995.
Carey, Bill, "Helicopter Operator Places Launch Order for Flexrotor UAV", Aviation International News Online, http://www.ainonline.com/aviation-news/aerospace/2015-01-05/helicopter-operator-places-launch-order-flexrotor-uav, Jan. 15, 2015.
Eshel, Tamir, "Sikorsky, Aurora Flight Sciences to Develop VTOL X-Planes for DARPA", Defense Update, http://defense-update.com/20131213_sikorsky-aurora-flight-sciences-develop-vtol-x-planes-darpa.html, Dec. 13, 2013.
Industry Network Engineering and Services, "Unmanned aircraft", Industry Network Engineering and Services, http://www.industry.co.jp/ines/, exact publication date unknown, (web page last visited Mar. 18, 2016).
Japan Aerospace Exploration Agency, "Four-engine told wing VTOL aircraft", Aeronautical Technology Directorate, http://www.aero.jaxa.jp/eng/research/frontier/vtol/qtw/, exact publication date unknown (web page last visited Mar. 22, 2016).
Krossblade Aerospace Systems LLC, "Krossblade SkyProwler Multi-Mission VTOL Transformer Drone", Kickstarter Campaign, https://www.kickstarter.com/projects/350745213/krossblade-skyprowler-multi-mission-vtol-transform/updates, exact publication date unknown, (web page last visited Mar. 18, 2016).
LAK, "LAK Genesis 2 Glider", https://en.wikipedia.org/wiki/LAK_Genesis_2, 1994, 2 pages.
Lee, R.E., "Convair XFY-1 Pogo", National Air and Space Museum, http://airandspace.si.edu/collections/artifact.cfm?object=nasm_A19730274000, Sep. 18, 2000.
Liszewski, Andrew, "Tilting Wings Let This New Air Hogs RC Plane Hover Like a Helicopter", Toyland Blog, http://toyland.gizmodo.com/tilting-wings-let-this-new-air-hogs-rc-plane-hover-like-1720002243, Jul. 24, 2015.
Madrigal, Alexis C., "Inside Google's Secret Drone-Delivery Program", The Atlantic, http://www.theatlantic.com/technology/archive/2014/08/inside-googles-secret-drone-delivery-program/379306/, Aug. 28, 2014.
Moore, Mark D., "NASA Puffin Electric Tailsitter VTOL Concept", NASA Technical Reports Server, http://ntrs.nasa.gov/archive/nasa/casi.ntrs.nasa.gov/20110011311.pdf, Sep. 13, 2010.
RC Groups, "Discussion: Tail Sitting VTOL," http://www.rcgroups.com/forums/showthread.php?t=1473333&page=4, Aug. 9, 2011.
Stone, et al., "Preliminary Design of a Tandem-Wing Tail-Sitter UAV Using Multi-Disciplinary Design Optimisation", Intl Aerospace Congress, Sydney, AU, Feb. 1997, 707-720.
Stone, et al., "The T-Wing: A VTOL UAV for Defense and Civilian Applications", UAV Australia Conference, Melbourne, AU, Feb. 2001, 13 pages.
Stone, H., Clarke, G. "Optimization of Transition Maneuvers for a Tail-Sitter Unmanned Air Vehicle (UAV)", Australian International Aerospace Congress, Paper 105, Canberra, Mar. 2001,14 pgs.
Suas News, "Arcturus UAV Upgrades the JUMP15 VTOL UAV", sUAS News-The Business of Drones, http://www.suasnews.com/2014/12/arcturus-uav-upgrades-the-jump15-vtol-uav/, Dec. 5, 2014.
Suas News, "Sony Ventures Unveils Drone Prototype", sUAS News-The Business of Drones, http://www.suasnews.com/2015/08/sony-venture-unveils-drone-prototype/, Aug. 24, 2015.
Suas News, "The Airbus Group's Quadcruiser concept is validated in flight tests", sUAS News—The Business of Drones, http://www.suasnews.com/2014/12/the-airbus-groups-quadcruiser-concept-is-validated-in-flight-tests/, Aug. 12, 2014.
Suas News, "Vertex VTOL UAV", sUAS News—The Business of Drones, http://www.suasnews.com/2014/12/vertex-vtol-uav/, Dec. 26, 2014.
United States Patent and Trademark Office, "International Search Report and Written Opinion", for PCT/US14/60166, Jun. 25, 2015, 11 pages.
United States Patent and Trademark Office, Non-Final Office Action for U.S. Appl. No. 14/460,013, Feb. 23, 2016, 18 pages.
University of Sydney, "University of Sydney T-Wing Website", http://www.aeromech.usyd.edu.au/uav/twing/, Sep. 2002.
Wikipedia, "Tail-sitter", https://en.wikipedia.org/wiki/Tail-sitter, exact publication date unknown, (web page last visited Mar. 18, 2016).
Xcraft, "X PlusOne", http://xcraft.io/x-plusone-drone/, exact publication date unknown, (web page last visited Mar. 18, 2016).
Xylakantsky, Ivan, "Chinese VTOL UAV VMA-01", YouTube, https://www.youtube.com/watch?v=GNTZ14ecUs8, Jun. 6, 2012.
U.S., "Non-Final Office Action", for U.S. Appl. No. 15/932,993, dated Feb. 14, 2017, 10 pgs.

* cited by examiner

ROTATING WING ASSEMBLIES FOR TAILSITTER AIRCRAFT

BACKGROUND

Traditional fixed-wing aircraft generally require long runways or launching systems to provide a distance for the aircraft to build sufficient speed to generate lift for flight. And runways are generally required for fixed-wing aircraft to land. Some aircraft, such as tailsitter aircraft and rotorcraft (including multirotor aircraft), avoid a need for horizontal space for take-off and landing by taking off and landing vertically. Tailsitter aircraft generally take off from (and land on) their tails, pitching between vertical and horizontal orientations for flight in midair.

But rotorcraft are not optimal for efficient horizontal flight because the rotor(s) must provide both lift and forward thrust. And tailsitter aircraft can be prone to tipping when landing or taking off in a vertical configuration due to a high center of gravity. A wide landing base is required to prevent the tailsitter from tipping over, especially when landing or taking off in windy conditions or from uneven ground.

Existing tailsitter aircraft may include a wide landing base or landing legs in the form of large vertical tails or fins. But such large tails or fins are not necessary for horizontal flight, so they reduce performance by increasing drag and weight. And some existing tailsitter aircraft may have large, retractable landing legs but these legs also require unnecessary increases to aircraft weight. Accordingly, existing tailsitter aircraft sacrifice performance (such as weight or aerodynamic qualities) in order to provide landing and ground stability.

SUMMARY

A tailsitter aircraft includes one or more rotatable wings. The tailsitter aircraft optionally includes a fuselage from which wing supports extend. Each rotatable wing optionally includes a rotatable wing section having an inboard portion proximate to the fuselage, and an outboard portion distal from the fuselage. The rotatable wing section may be rotatably attached to the wing support and configured to rotate between a vertical flight configuration in which the inboard portion is positioned on an opposing side of the wing support relative to the outboard portion, and a horizontal flight configuration different from the vertical flight configuration. Other features and advantages will appear hereinafter. The features described above can be used separately or together, or in various combinations of one or more of them.

BRIEF DESCRIPTION OF THE DRAWINGS

In the drawings, wherein the same reference number indicates the same element throughout the views.

DETAILED DESCRIPTION

The present technology is directed to rotating wing assemblies for tailsitter aircraft, and aircraft having rotating wings. Various embodiments of the technology will now be described. The following description provides specific details for a thorough understanding and enabling description of these embodiments. One skilled in the art will understand, however, that the invention may be practiced without many of these details. Additionally, some well-known structures or functions, such as structures or functions common to aircraft, may not be shown or described in detail so as to avoid unnecessarily obscuring the relevant description of the various embodiments. Accordingly, the technology may have other embodiments with additional elements or without several of the elements described below with reference to FIGS. 1-23.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this detailed description section.

Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all of the items in the list, or (c) any combination of items in the list. Further, unless otherwise specified, terms such as "attached" or "connected" are intended to include integral connections, as well as connections between physically separate components.

Specific details of several embodiments of the present technology are described herein with reference to unmanned aerial vehicles (UAVs) or standalone wings using rotors or propellers for propulsion. In other embodiments, the technology may be used in manned or passenger-carrying aircraft, or in aircraft using other types of propulsion including, for example, turbofan propulsion, turbojet propulsion (or other jet propulsion), ramjet propulsion, rocket propulsion, or other suitable propulsion systems.

The present technology provides rotating wing assemblies for tailsitter aircraft, and aircraft having rotating wings. Examples of this technology are illustrated in FIGS. 1-23.

Figure 1:
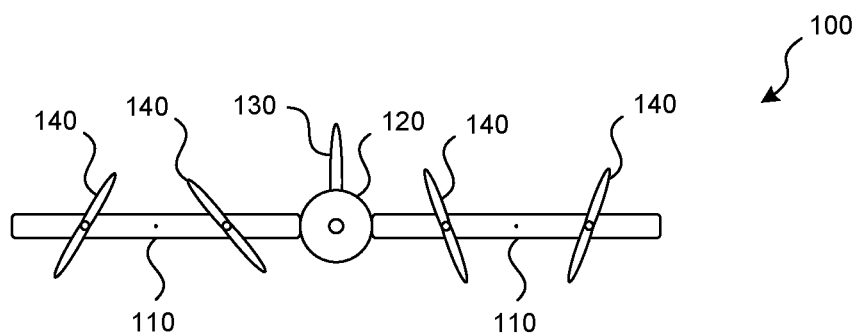
FIG. 1 illustrates a nose view of an aircraft in accordance with several embodiments of the present technology.

FIG. 1 illustrates an aircraft 100 having one or more wings 110 (for example, two wings) that may be mounted or otherwise attached to a main body or fuselage 120. The fuselage may have a vertical stabilizer 130, canards, a horizontal stabilizer, or other suitable aerodynamic or control features, or it may lack one or more such features. In various embodiments, the fuselage 120 may take various forms sufficient to support one or more wings 110. For example, the fuselage 120 may be, but does not need to be, cylindrical in shape. One or more rotors 140 may be attached to the wings 110. The rotors 140 may be powered by motors, engines, or other suitable power delivery systems. Note that although rotors are described and illustrated herein, embodiments of the present technology may use other suitable forms of propulsion, as described above. And while four rotors 140 are illustrated, more or fewer propulsion systems may be used. Further, while puller (tractor) rotors are generally illustrated in FIG. 1 and other figures, embodiments of aircraft according to the present technology may optionally use pusher rotors, or a combination of puller and pusher rotors. Accordingly, embodiments of aircraft according to the present technology may have various arrangements or combinations of lifting surfaces, control surfaces, or propulsion features. In the configuration illustrated in FIG. 1, the wings 110 may have any suitable airfoil shape to provide lift to the aircraft 100 when the aircraft 100 is in horizontal flight.

Figure 2:
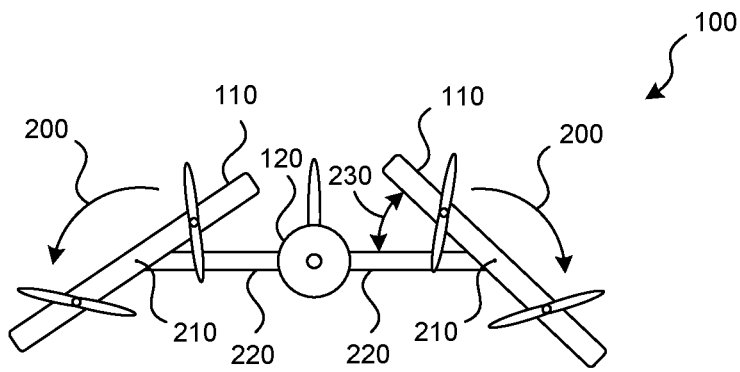
FIG. 2 illustrates a nose view of a configuration of the aircraft shown in FIG. 1 in which the wings are at least partially rotated.

As shown in FIG. 2, wing supports 220 extend from an inboard region of the aircraft, such as the fuselage 120, to support the wings 110. Arrows 200 illustrate the directions of rotation about pivot axes 210 between the wings 110 and the wing supports 220. Each pivot axis 210 is generally transverse to a span of each wing 110 and may generally align with a chordwise direction between a leading edge and a trailing edge of each wing 110. The wing supports 220 may remain stable with respect to the fuselage 120 and serve as a structural link between the wings 110 and the fuselage 120. In some embodiments, such as the embodiment generally illustrated in FIG. 2, the wings 110 may rotate in opposite directions with respect to the fuselage 120 or wing supports 220. Although the arrows 220 in FIG. 2 illustrate a top surface of the wings 110 rotating away from the fuselage, in some embodiments, the wings 110 may rotate inwardly toward the fuselage. The wings 110 may rotate to an angle 230 (between the wings 110 and the wing supports 220) within the range of approximately 20 degrees to 160 degrees in some embodiments, while in other embodiments, other suitable rotation angles may be used. Accordingly, FIG. 2 may illustrate a final rotated position of the wings 110, or it may illustrate a partially rotated position of the wings 110 as they transition to a fully rotated position.

Figure 3:
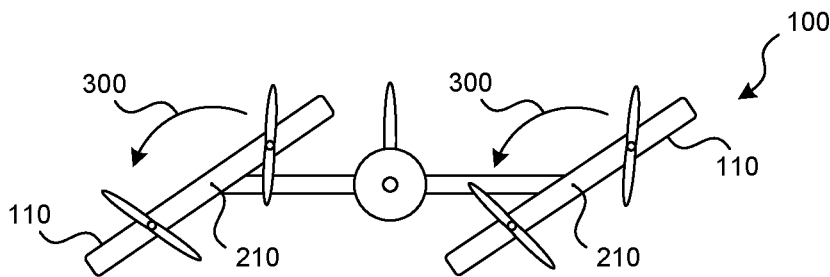
FIG. 3 illustrates a nose view of another configuration of the aircraft shown in FIG. 1 in which the wings are at least partially rotated.

FIG. 3 illustrates a nose view of another configuration of the aircraft 100 in which the wings 110 are at least partially rotated, in accordance with another embodiment of the present technology. Arrows 300 illustrate rotation of the wings 110 about the pivot axes 210 in the same direction. In such an embodiment, the wings 110 may produce lift in the same direction when fully or partially rotated. Accordingly, in various embodiments of the technology, the wings 110 may rotate about the pivot axes 210 in various directions and combinations of directions. FIG. 3 may illustrate a final rotated position of the wings 110, or it may illustrate a partially rotated position of the wings 110 as they transition to a fully rotated position.

Figure 4:
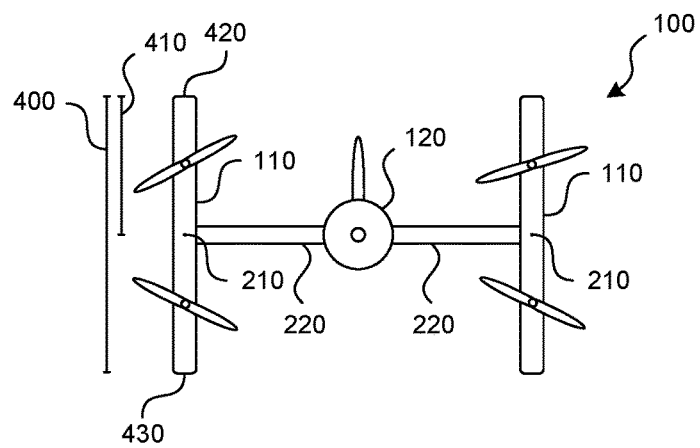
FIG. 4 illustrates a nose view of another configuration of the aircraft shown in FIG. 1 in which the wings have been rotated.

One such fully rotated position in accordance with an embodiment of the present technology is generally illustrated in FIG. 4. In this embodiment, the wings 110 have been rotated to an angle of approximately 90 degrees relative to the wing supports 220. In this configuration, the aircraft 100 may be operated in vertical flight. The wings 110 may be rotated during flight to facilitate transition between vertical flight and horizontal flight configurations (for example, a horizontal flight configuration illustrated in FIG. 1, in which the wings 110 are positioned at an angle of approximately 0 degrees relative to the wings supports 220).

In particular embodiments of the present technology, each pivot axis 210 may be centrally located along a wingspan 400, or it may be located in other positions. For example, the distance 410 from a wing root 420 to the pivot axis 210 may be between approximately 10 percent and 90 percent of the wingspan 400. Such locations of the pivot axis 210 allow a portion of the wing 110—for example, a portion having the root 420—to be positioned above the pivot axis 210, the wing supports 220, or a center of gravity of the aircraft, while another portion—for example, a portion having a wing tip 430—may be positioned below the pivot axis 210, the wing supports 220, or the center of gravity of the aircraft. Such arrangements may provide a stable base for the aircraft 100 when it is landing or taking off vertically in a tailsitter orientation, as further described below. The pivot axis 210 may be provided by a joint, such as a hinge, a joint assembly, or another suitable interface capable of providing relative rotation between the wing 110 and a wing support 220.

In some embodiments, the pivot axis 210 need not be located between approximately 10 percent and 90 percent of the wingspan 400. Rather, the pivot axis 210 may be located in a position sufficient to provide a stable base for a tailsitter orientation of the aircraft 100 (generally illustrated in FIG. 6, for example, which is described below). For example, in particular orientations, the pivot axis 210 may be positioned to cause a first portion of each wing 110 to be positioned opposite the center of gravity of the aircraft 100 from a second portion of the wing 110.

Figure 5:
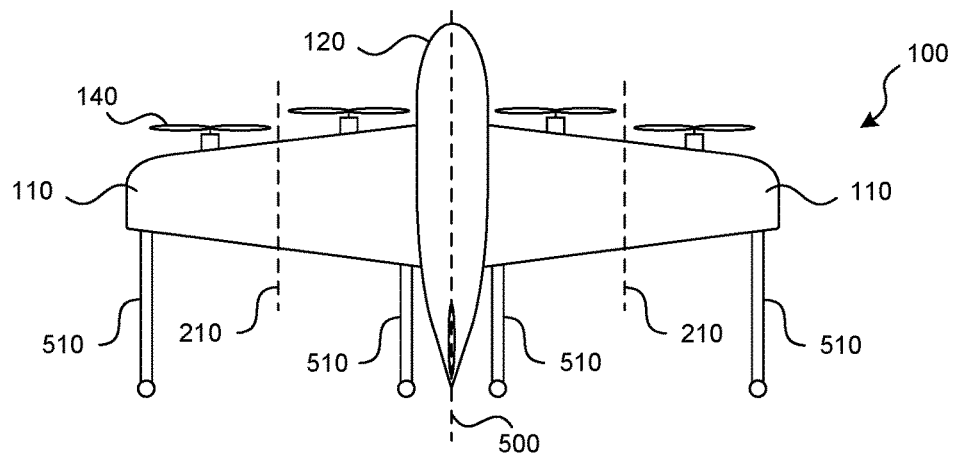
FIG. 5 illustrates a top view of an aircraft in accordance with several embodiments of the present technology.

In the embodiment shown in FIG. 5, the pivot axis 210 of each wing 110 is parallel to a longitudinal axis 500 of the aircraft 100. In some embodiments, the pivot axis 210 may be oriented at an angle with respect to the longitudinal axis 500. In particular embodiments, the pivot axis 210 may be tilted up to an angle of approximately 80 degrees with respect to the longitudinal axis 500. Tilting the pivot axis 210 may accommodate various swept-wing designs, for example, as described in detail with respect to FIG. 16 below.

Figure 6:
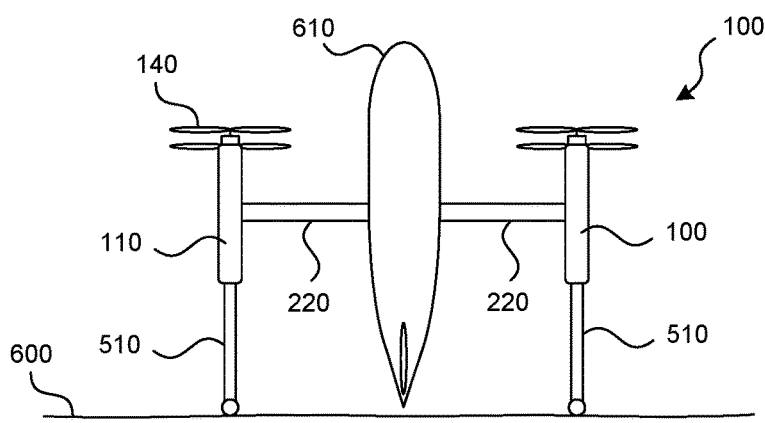
FIG. 6 illustrates a top view of the aircraft shown in FIG. 5 in which the wings have been rotated.

In some embodiments, the aircraft 100 may have one or more landing gear units or landing legs 510 to support the aircraft 100 when it is on a surface in a vertical take-off or landing position. For example, the landing leg(s) 510 may be attached to end portions of the wings 110 to provide spacing for a stable tailsitter landing orientation when the wings 110 are rotated (as illustrated in FIG. 6, for example). During horizontal flight, the landing leg(s) 510 may trail behind the wings 110 and may be oriented to cause minimal drag. The landing leg(s) 510 may be retractable or stowable to further reduce drag.

FIG. 6 illustrates a top view of the aircraft 100 in which the wings 110 have been rotated to an angle of approximately 90 degrees relative to the wing supports 220 (as generally illustrated in the nose view of FIG. 4, for example). Note that although the view in FIG. 6 has been described as a "top view," FIG. 6 illustrates the aircraft 100 positioned on the ground or other surface 600 in a configuration for vertical take-off or landing, with the nose 610 of the aircraft 100 pointed toward an upward flight direction. In such a configuration, a top side of each wing support 220 is visible. The landing leg(s) 510 (of which only two are visible in FIG. 6) provide a stable base for vertical take-off or landing of the aircraft 100.

In operation, an aircraft 100 may take off in a generally upward direction in a nose-first, vertical configuration, such as a configuration generally illustrated and described with regard to FIGS. 2, 3, 4, and 6. In such configurations, as described above, the wings 110 may be oriented so that portions of each wing are positioned on opposite sides of a center of gravity of the aircraft 100. And if the aircraft 100 has landing gear (for example, landing leg(s) 510), the landing gear may be positioned on opposite sides of the center of gravity. The rotors 140, or other suitable propulsion system(s), provide vertical thrust to lift the aircraft 100 from the ground or other surface 600. Upon reaching suitable elevation or airspeed (such as vertical climbing speed), the aircraft 100 may be controlled to pitch forward to engage in horizontal flight. Before, during, or after the act of pitching forward, the wings 110 of the aircraft 100 may be rotated about the pivot axes 210 toward a configuration in which the wings 110 are generally horizontal, such as the configuration generally illustrated in FIGS. 1 and 5. In horizontal flight, the wings 110 produce lift, while the rotors 140 produce horizontal thrust. A user may operate the aircraft 100 in horizontal flight in a conventional manner. The wings 110 may produce lift even when they are not fully horizontal, such as in the partially rotated configuration illustrated in FIG. 2.

To land in a vertical configuration (for example, as illustrated in FIG. 6), the aircraft 100 may pitch up until the rotors 140 are capable of providing sufficient vertical lift for the aircraft 100. Before, during, or after the act of pitching upward, the wings 110 of the aircraft 100 may be rotated about the pivot axes 210 toward the vertical take-off and landing configurations. Although embodiments of the present technology have been described with respect to both vertical take-off and vertical landing, in some embodiments, aircraft of the present technology may take off horizontally and land vertically, or they may take off vertically and land horizontally. The transition between vertical and horizontal configurations (including folding or rotating the wings) may happen during flight or before or after flight.

Aircraft in accordance with embodiments of the present technology provide vertical take-off and landing configurations (such as a tailsitter or multirotor configurations) and horizontal flight configurations while avoiding excess weight and drag associated with structure that is generally used only for one configuration or the other.

In various embodiments of the present technology, the wings 110 may be rotated using various mechanisms, such as one or more belt drives, gear drives, linkages to motors or actuators, rack and pinion systems, electrical motor systems, hydraulic systems, or other suitable mechanisms capable of rotating the wings 110 about the pivot axes 210. In other embodiments, aerodynamic effects may be used to manipulate the wings 110. For example, the moment of force from an aileron or torque induced from propulsion, including propwash, may be used to rotate the wings 110.

Figure 7:
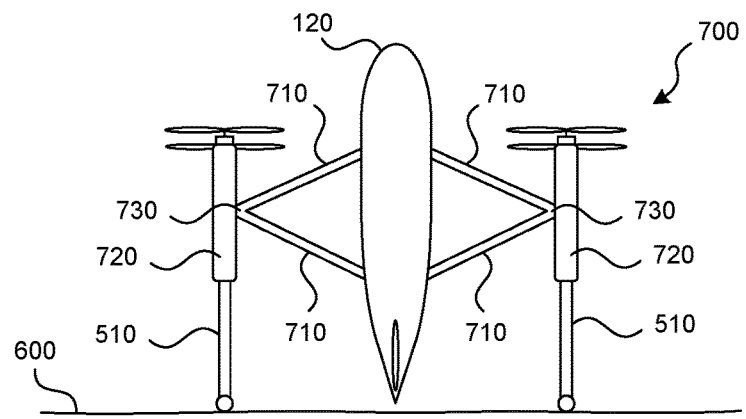
FIG. 7 illustrates a top view of an aircraft in a vertical take-off or landing configuration in accordance with another embodiment of the present technology.

FIG. 7 illustrates a top view of an aircraft 700 in a vertical take-off or landing configuration in accordance with another embodiment of the present technology. Multiple wing supports 710 may support each wing 720. For example, a pair of wing supports 710 may extend from the fuselage 120 in a triangular or truss shape, or in any other suitable configuration. Each wing 720 may pivot about a single pivot point 730, as illustrated in FIG. 7, or about multiple pivot points.

Figure 8:
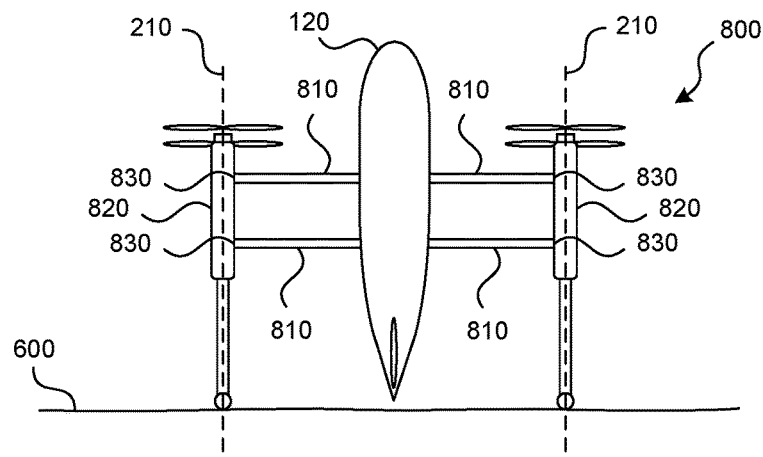
FIG. 8 illustrates a top view of an aircraft in a vertical take-off or landing configuration in accordance with another embodiment of the present technology.

FIG. 8 illustrates a top view of an aircraft 800 in a vertical take-off or landing configuration in accordance with another embodiment of the present technology. A plurality of wing supports 810 may extend laterally from each of a left and right side of the fuselage 120 to support rotatable wings 820. In such embodiments, there may be multiple pivot points 830 along the pivot axes 210. Although two wing supports 810 are illustrated on each side of the fuselage 120, in other embodiments, other suitable numbers or arrangements of wing supports may be used. For example, in some embodiments, there may be ten wing supports 810 and ten corresponding pivot points 830 for each wing 820.

Figure 9:
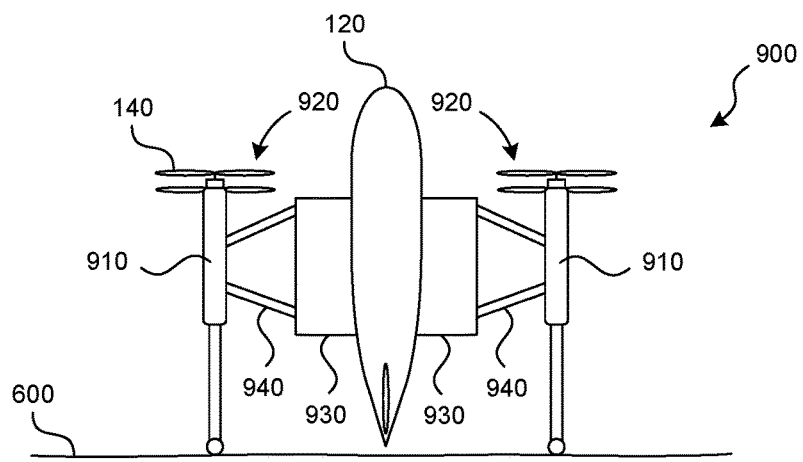
FIG. 9 illustrates a top view of an aircraft in a vertical take-off or landing configuration in accordance with another embodiment of the present technology.
Figure 10:
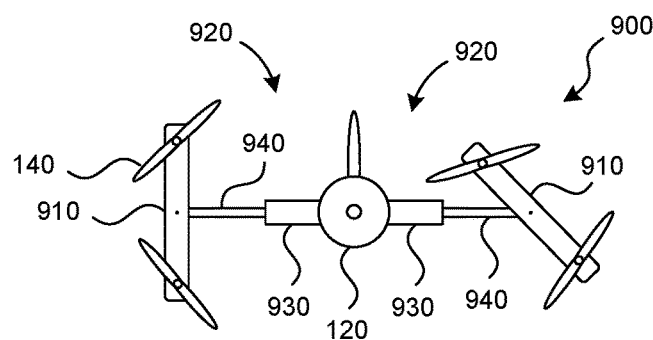
FIG. 10 illustrates a nose view of the aircraft shown in FIG. 9.

Rotatable portions of wings of the present technology may, but need not, include the entire length of the wings. For example, FIGS. 9 and 10 illustrate an aircraft 900 in accordance with another embodiment of the present technology, in which a rotating section 910 of each wing 920 rotates generally as described above, while a fixed section 930 remains in place adjacent to the fuselage 120. The fixed section 930 may have an airfoil shape to provide lift during the transition between vertical and horizontal flight, and during horizontal flight. In some embodiments, other portions of the wing 920 may be fixed. Various configurations of wing supports 940 extending from the fuselage 120 or the fixed sections 930 may be used in various embodiments of the technology to support the rotating wing sections 910.

In several embodiments of the present technology, the wings (for example, 110, 910) need not rotate to equal angles to accommodate a vertical landing or take-off configuration. FIG. 10, for example, illustrates a nose view of the aircraft 900 illustrated in FIG. 9, in which the wings 920 have been rotated to different angles.

Figure 11:
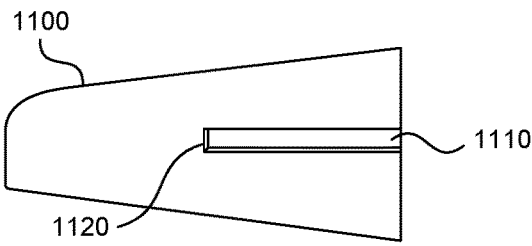
FIG. 11 illustrates a bottom view of a wing in accordance with an embodiment of the present technology.

FIG. 11 illustrates a bottom view of a wing 1100 in accordance with an embodiment of the present technology. In order to reduce drag associated with the wing supports during horizontal flight (for example, wing supports 220, 710, 810, 940), a wing 1100 of the present technology may include a slot or recess 1110 that partially or fully receives a wing support when the wing 1100 is in a level configuration for horizontal flight (such as in FIG. 1). For example, a wing support may be fully seated in the recess 1110 so that it is flush with (or recessed relative to) a surface of the wing 1100. The wing 1100 may rotate about a pivot point 1120 located at a distal or outboard end of the recess 1110.

Figure 12:
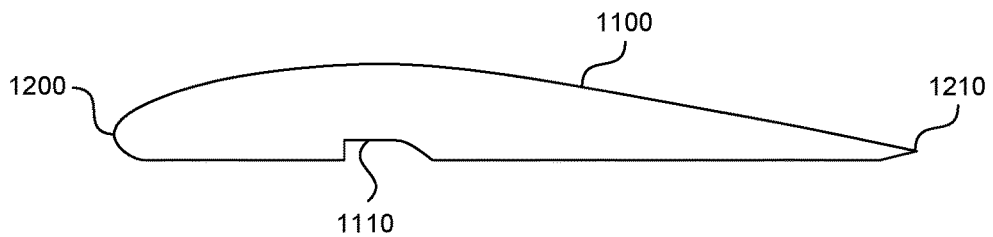
FIG. 12 illustrates a cross-sectional view of the wing shown in FIG. 11.

FIG. 12 illustrates a cross-sectional view of the wing 1100 illustrated in FIG. 11. The recess 1110 may be located along a bottom surface of the wing 1100 at any suitable position between a leading edge 1200 and a trailing edge 1210 of the wing 1100. In some embodiments, and depending on the direction of rotation of a wing, wing supports may be received in or against a top surface of the wing 1100. In such embodiments, the recess 1110 may be located along the top surface of the wing 1100.

Figure 13:
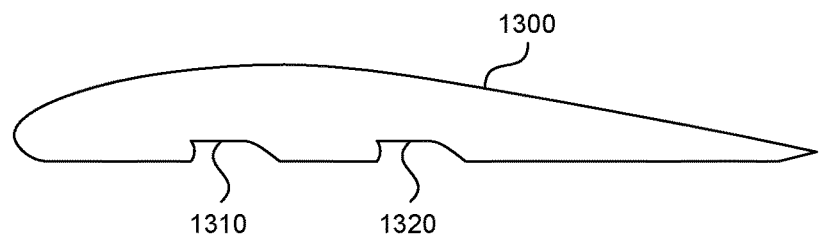
FIG. 13 illustrates a cross-sectional view of a wing in accordance with another embodiment of the present technology.

FIG. 13 illustrates a cross-sectional view of a wing 1300 in accordance with another embodiment of the present technology, in which the wing 1300 has a plurality of recesses 1310, 1320 formed in a lower surface of the wing 1300 to accommodate a corresponding plurality of wing supports. In other embodiments of the technology, various shapes or orientations of the recesses may correspond to suitable shapes or orientations of wing supports (for example, a triangular arrangement of wing supports 710 as generally illustrated in FIG. 7). In some embodiments, a plurality of recesses may be positioned along the top surface of the wing 1100.

Figure 14:
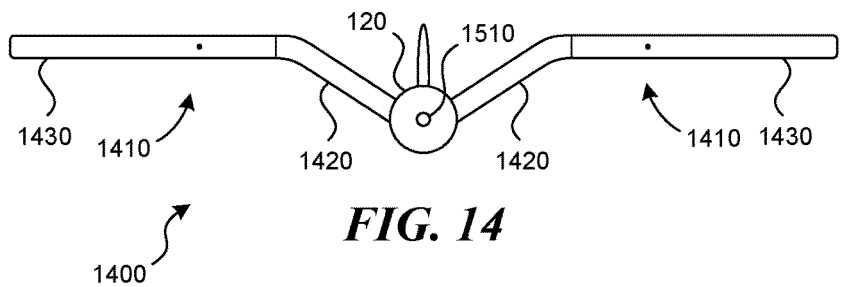
FIG. 14 illustrates a nose view of an aircraft in accordance with another embodiment of the present technology.
Figure 15:
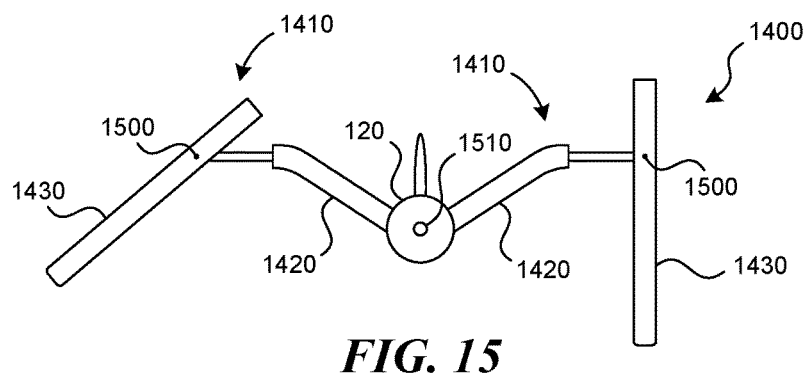
FIG. 15 illustrates a nose view of the aircraft shown in FIG. 14 in which the wings have been at least partially rotated.

FIGS. 14 and 15 illustrate an aircraft 1400 in accordance with another embodiment of the present technology. FIG. 14 illustrates the aircraft 1400 in a configuration for generally horizontal flight, in which the wings 1410 may have a gull-wing configuration. For example, a fixed root portion 1420 of each wing 1410 may extend angularly, upwardly, and outwardly from the fuselage 120 toward a generally horizontal main wing portion 1430 positioned at an end of the root portion 1420. FIG. 15 illustrates the aircraft 1400 in a configuration in which the main wing portions 1430 are rotated at different angles about pivot axes 1500. In some embodiments, the pivot axes 1500 may be positioned to locate a center of gravity 1510 of the aircraft 1400 near a central location between vertical landing or take-off support points (for example, the landing legs 510 described above). Note that although propulsion is not illustrated in FIGS. 14 and 15, any suitable propulsion system may be used in the aircraft 1400.

Figure 16:
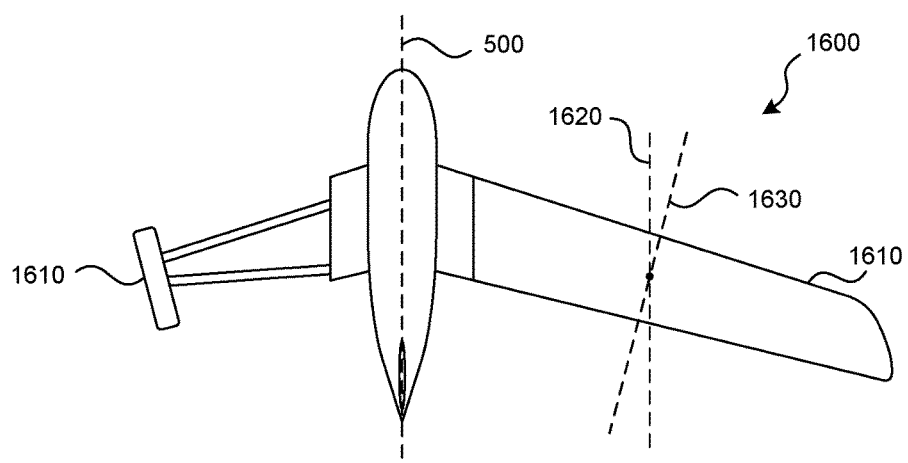
FIG. 16 illustrates an aircraft having swept wings in accordance with other embodiments of the present technology.

FIG. 16 illustrates an aircraft 1600 having swept wings 1610 in accordance with other embodiments of the present technology. In FIG. 16, for illustrative purposes, one wing 1610 is rotated while another wing 1610 remains in a configuration for horizontal flight. In some embodiments, a pivot axis 1620 may be generally parallel to the longitudinal axis 500 of the aircraft 1600 even if the wings are swept towards a tail of the aircraft 1600. In other embodiments, a pivot axis 1630 may be oriented at an angle relative to the longitudinal axis 500 of the aircraft 1600. In some embodiments, a pivot axis may be oriented between +80 and −80 degrees relative to the longitudinal axis 500 of the aircraft 1600.

Figure 17:
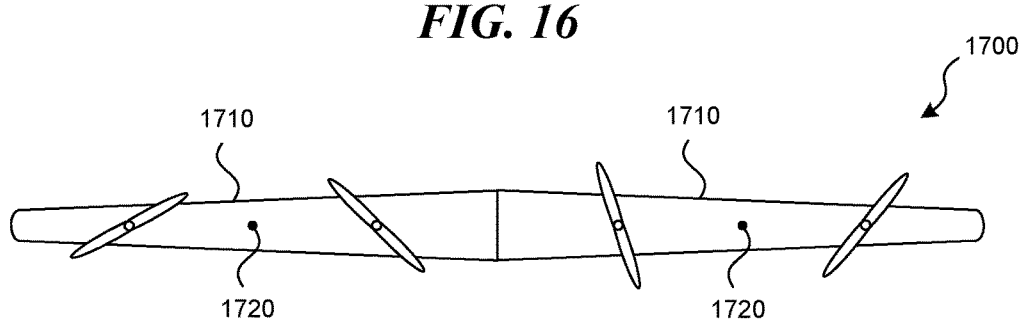
FIG. 17 illustrates a flying wing type aircraft in accordance with another embodiment of the present technology.

FIG. 17 illustrates a flying-wing-type aircraft 1700 in accordance with another embodiment of the present technology. In this embodiment, a fuselage (for example, the fuselage 120 described above) is omitted. Each wing 1710 may be mounted to one or more wing supports (not shown) and positioned to rotate about a pivot axis 1720 (for example, an axis of a joint) to move between horizontal and vertical flight configurations.

Figure 18:
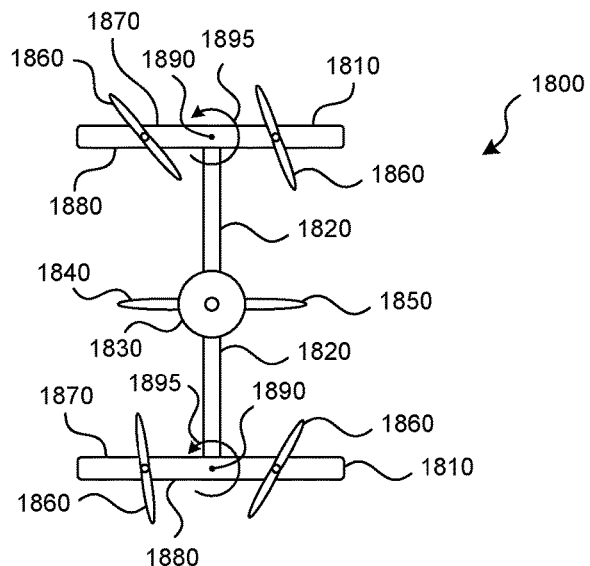
FIG. 18 illustrates a nose view of an aircraft in a vertical or horizontal flight configuration in accordance with another embodiment of the present technology.

As described above, in some embodiments, wings may provide lift during the transition between vertical and horizontal flight configurations. As another example, FIG. 18 illustrates a nose view of an aircraft 1800 in a vertical take-off or landing configuration in accordance with another embodiment of the present technology, in which each wing 1810 has been rotated to be approximately perpendicular to a corresponding wing support 1820. In such a configuration, the aircraft 1800 may take off nose-first and vertically from a tail-down orientation (or it may land in a tail-down orientation) in a manner similar to other embodiments described above, such as the embodiments described with regard to FIGS. 4 and 6. The wing supports 1820 extend outwardly from a fuselage 1830, which may optionally have an upper vertical stabilizer 1840 and/or a lower vertical stabilizer 1850.

Each wing 1810 may be provided with an airfoil cross-section. For example, an airfoil top surface 1870 may be positioned opposite an airfoil lower surface 1880 on each wing 1810. One such lower surface 1880 may face towards the fuselage 1830, while the other lower surface 1880 may face away from the fuselage 1830. In such a configuration, each wing 1810 may provide lift for the aircraft 1800 during and after the aircraft's 1800 maneuver to pitch forward into horizontal flight from vertical flight. Accordingly, in some embodiments, the aircraft 1800 may fly nose-first in horizontal flight with the wings 1810 in the configuration illustrated in FIG. 18. In other words, the aircraft 1800 may be flown generally like a bi-plane, with the fuselage 1830 positioned between the wings 1810.

Each wing 1810 may have one or more propulsion systems 1860, which may be similar to other propulsion systems disclosed herein (for example, rotors 140) for providing lift during vertical flight or thrust during horizontal flight. The aircraft 1800 may have landing support structure extending from the wings 1810 or from the fuselage 1830 (for example, landing legs 510 illustrated in FIG. 5) to support the aircraft 1800 when on the ground in a vertical flight configuration. The wings 1810 may rotate relative to the wing supports 1820 before, during, or after flight, and they may rotate in the same direction 1895 about one or more pivot axes 1890.

Figure 19:
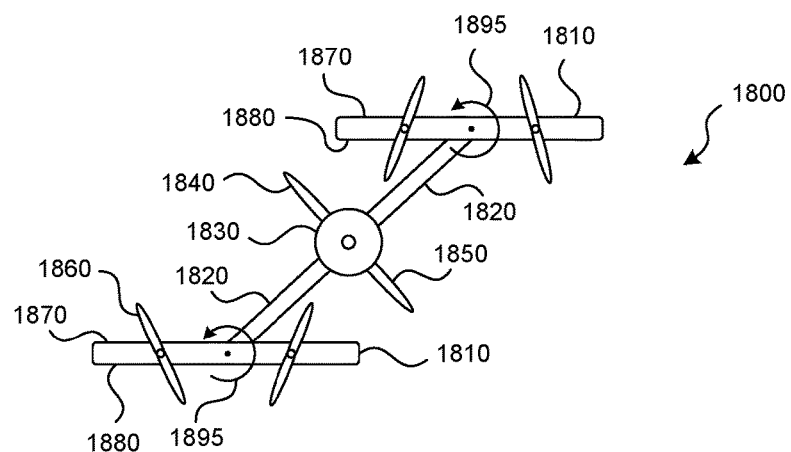
FIG. 19 illustrates a nose view of another configuration of the aircraft shown in FIG. 18.

FIG. 19 illustrates a nose view of another configuration of the aircraft 1800 in which the wings 1810 are partially rotated relative to the wing supports 1820. In such a configuration, the aircraft 1800 may be deemed to be in transition to or from fully horizontal flight, or in some embodiments, the aircraft 1800 may fly vertically or horizontally in this configuration. As the wings 1810 are rotated, the fuselage 1830 may also rotate, such that the wings 1810 remain generally level and capable of producing lift during or after the transition to or from horizontal flight.

Figure 20:
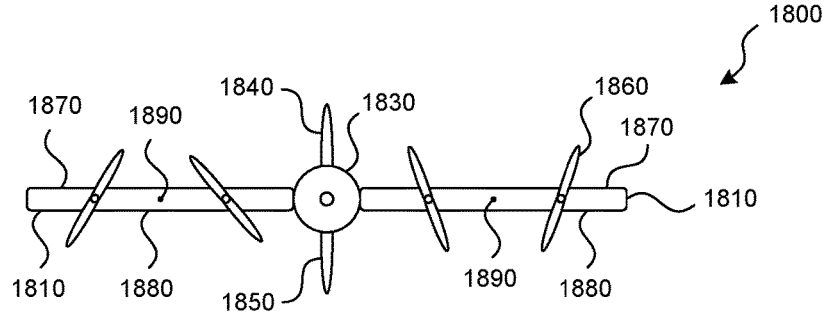
FIG. 20 illustrates a nose view of a horizontal flight configuration of the aircraft shown in FIG. 18.

FIG. 20 illustrates a nose view of another configuration of the aircraft 1800 in which the wings 1810 are generally level with the wing supports 1820. In this view, the wing supports 1820 are not visible, in part because in this configuration they have been received within corresponding recesses such as those described above with regard to FIGS. 11-13. For example, there may be a recess in a top surface 1870 of the left wing and a recess in a bottom surface 1880 of the right wing, to receive the corresponding left and right wing supports 1820. In the horizontal flight configuration illustrated in FIG. 20, the aircraft 1800 may fly along a generally horizontal trajectory until pitching upward and transitioning back to a vertical flight configuration (for example, FIG. 18) for a tail-down landing or other flight operations.

Figure 21A:
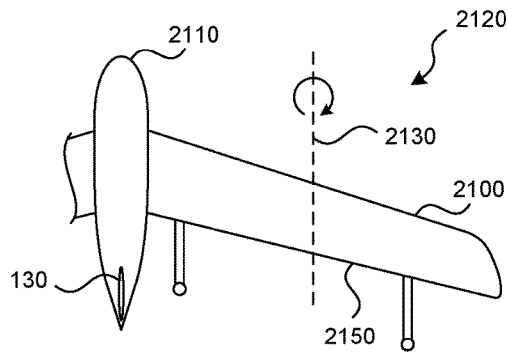
FIGS. 21A, 21C, and 21E illustrate top views of an aircraft having a wing capable of rotating in two axes in various configurations in accordance with another embodiment of the present technology.
Figure 21B:
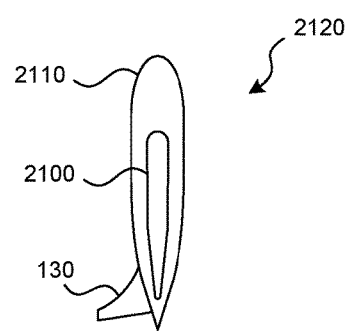
FIGS. 21B, 21D, and 21F illustrate side views of the aircraft shown in FIGS. 21A, 21C, and 21E, respectively.
Figure 21C:
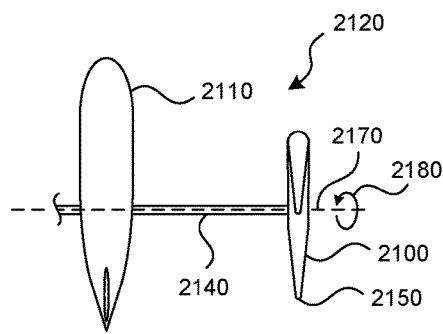
Figure 21D:
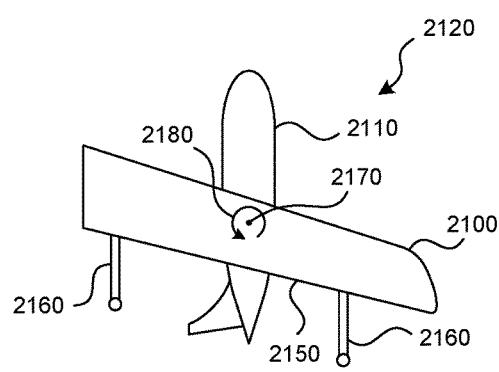
Figure 21E:
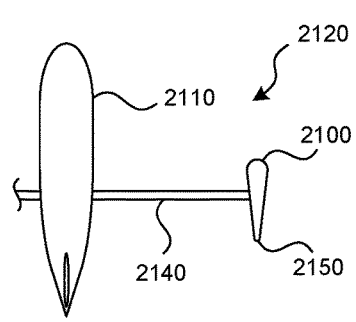
Figure 21F:
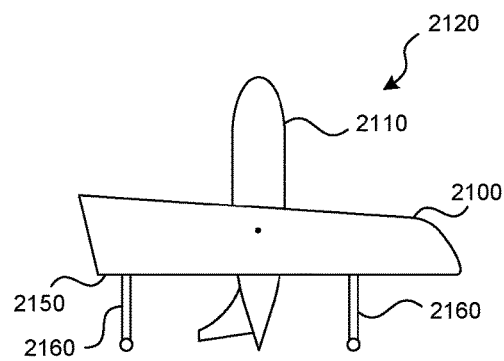

FIGS. 21A through 21F illustrate two-axis rotation of a wing 2100 relative to a fuselage 2110 of an aircraft 2120 capable of vertical take-off or landing in accordance with another embodiment of the present technology. For convenience, only a right-side wing 2100 of the aircraft 2120 is illustrated, although a corresponding two-axis rotation may be used on a left-side wing of the aircraft 2120. FIGS. 21A, 21C, and 21E illustrate partial top views of the aircraft 2120, while FIGS. 21B, 21D, and 21F illustrate side views of the aircraft 2120.

Specifically, FIGS. 21A and 21B illustrate the aircraft 2120 in a generally horizontal flight configuration in which the wing 2100 is oriented for horizontal flight as described above. The wing 2100 may be rotatable about a first axis 2130 to move between the horizontal flight configuration to a vertical flight configuration as described above. The first axis 2130 may generally align with a longitudinal axis of the fuselage 2110, for example, or it may be oriented at an oblique or other angle relative to the fuselage.

FIGS. 21C and 21D illustrate the aircraft 2120 in transition to, or after transition to, a vertical flight configuration, in which the wing 2100 has been rotated about the first axis 2130. One or more wing supports 2140 support the wing 2100. As seen in FIG. 21D, if the wing 2100 is a swept wing, a trailing edge 2150 may be oriented at an oblique angle with respect to the fuselage 2110 after the wing 2100 has been rotated about the first axis 2130. In some embodiments, landing support structure (such as landing legs 2160) may extend from the wing 2100 in such a manner that it is not level to the ground in this configuration and when in a tail-down or vertical flight orientation. Other aspects may exist as a result of the wing 2100 being oriented at an oblique angle relative to the fuselage 2110 when in a vertical flight configuration. Accordingly, the wing 2100 may be rotated about a second axis 2170, as generally illustrated by the arrow 2180 in FIGS. 21C and 21D. The second axis 2170 may be provided by a joint, a joint assembly, or another suitable interface capable of providing relative rotation between the wing 2100 and the wing support 2140.

FIGS. 21E and 21F illustrate the aircraft 2120 in a vertical flight configuration in which the wing 2100 has been rotated about the second axis 2170 to cause the trailing edge 2150 to be oriented generally perpendicular to the fuselage 2110 or level to the ground. In such a configuration, landing support structure (such as landing legs 2160) may be oriented level to the ground. Note that for simplicity in illustration, landing support structure (such as landing legs 2160) is not shown in all of FIGS. 21A-21F, and is optional in various embodiments. Although two rotations are illustrated and described herein, there may be more than two axes with corresponding rotations, and any rotations may occur in sequence, in reverse sequence, or simultaneously.

Figure 22:
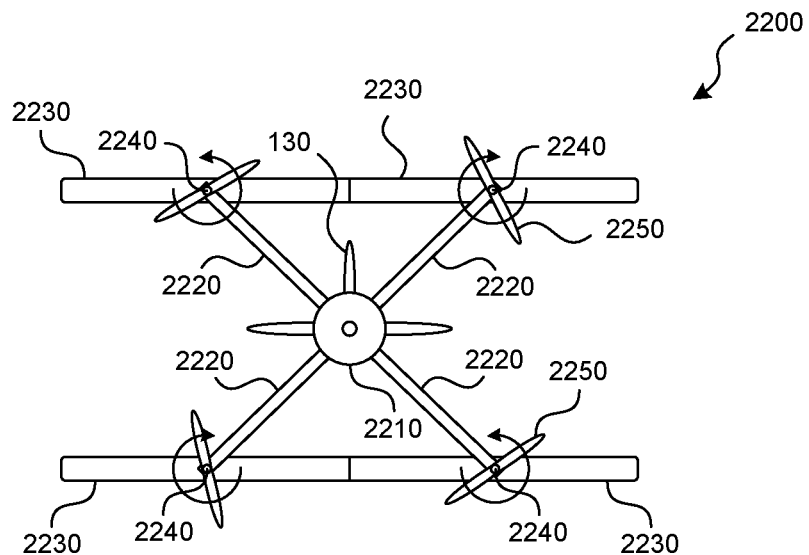
FIG. 22 illustrates a nose view of an aircraft in a first configuration in accordance with another embodiment of the present technology.

FIG. 22 illustrates an aircraft 2200 in a first configuration in accordance with another embodiment of the present technology. The aircraft 2200 may include a fuselage 2210 and a plurality of wing supports 2220 (for example, four wing supports) extending from the fuselage 2210. Each wing support 2220 may support a wing or wing segment 2230. Each wing segment 2230 may be positioned to rotate relative to its corresponding wing support 2220 about a pivot axis 2240. The pivot axis 2240 may be provided by a joint, such as a hinge, a joint assembly, or another suitable interface capable of providing relative rotation between a wing segment 2230 and a wing support 2220. In some embodiments, a rotor 2250 or other propulsion system may be located at or near the pivot axis 2240, or a propulsion system may be located at other suitable positions on the wing segments 2230 or the fuselage 2210. The configuration shown in FIG. 22 may accommodate vertical or horizontal flight. For example, the aircraft 2200 may function similar to a biplane when in horizontal flight, and it may be oriented to land in a tail-down orientation similar to other embodiments described herein.

Figure 23:
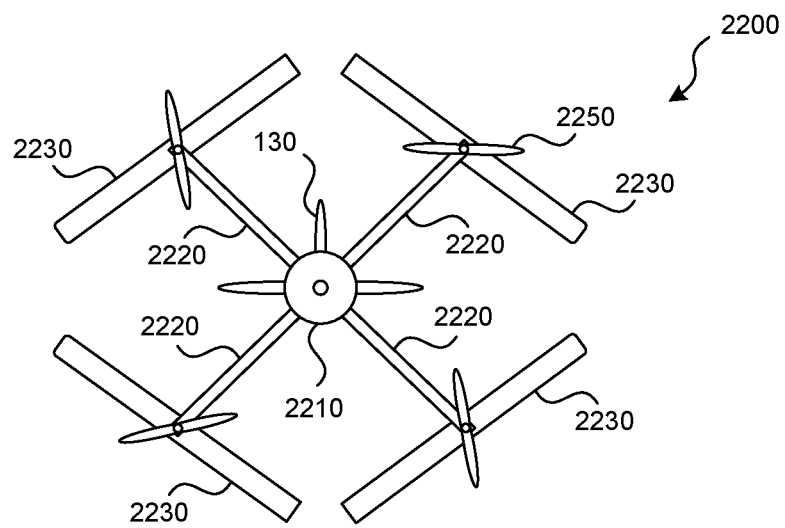
FIG. 23 illustrates a nose view of the aircraft shown in FIG. 22, in a second configuration.

FIG. 23 illustrates the aircraft 2200 shown in FIG. 22, in a second configuration, in which each wing segment 2230 has been rotated relative to a corresponding wing support 2220. For example, each wing segment 2230 may be rotated to be oriented approximately perpendicular to its corresponding wing support 2220. Such a second configuration provides a wide landing base for a vertical, tail-down take-off or landing.

From the foregoing, it will be appreciated that specific embodiments of the disclosed technology have been described for purposes of illustration, but that various modifications may be made without deviating from the technology, and elements of certain embodiments may be interchanged with those of other embodiments. For example, in some embodiments, various types and quantities of aircraft propulsion systems may be used and there may be various numbers of wing supports (for example, 220, 710, 810, 940) or wings. In yet further embodiments, landing legs (for example, landing legs 510) may be deployable and retractable, or omitted in favor of other landing support structure. Although various embodiments disclosed herein may utilize various aerodynamic control structures—such as stabilizers, canards, ailerons, elevons, or other aerodynamic structures—such structures are not necessary in every embodiment, and may be omitted or combined in various embodiments.

Further, while advantages associated with certain embodiments of the disclosed technology have been described in the context of those embodiments, other embodiments may also exhibit such advantages, and not all embodiments need necessarily exhibit such advantages to fall within the scope of the technology. Accordingly, the disclosure and associated technology may encompass other embodiments not expressly shown or described herein, and the invention is not limited except as by the appended claims.

What is claimed is:

1. A vertical take-off or landing aircraft comprising:
   a wing support extending from an inboard region of the aircraft;
   a wing mounted on the wing support;
   a first propulsion system attached to the wing; and
   a second propulsion system attached to the wing; wherein the wing is positioned to rotate about an axis between a horizontal flight configuration in which the wing is generally aligned with the wing support and a vertical flight configuration in which the wing is oriented at an angle relative to the wing support, wherein the axis is positioned between the first propulsion system and the second propulsion system, and wherein the axis is oriented along a chordwise direction of the wing.

2. The vertical take-off or landing aircraft of claim 1, further comprising a landing leg attached to the wing and extending toward a tail end of the aircraft, the landing leg positioned to at least partially support the aircraft when the aircraft is on a landing surface in the vertical flight configuration.

3. The vertical take-off or landing aircraft of claim 1 wherein when the aircraft is in the horizontal flight configuration, the wing has an inboard portion positioned proximate to the inboard region and a tip portion positioned distal to the inboard region, and wherein when the aircraft is in the vertical flight configuration, the inboard portion and the tip portion are positioned on opposing sides of a center of gravity of the aircraft.

4. The vertical take-off or landing aircraft of claim 1 wherein the angle is between 20 degrees and 160 degrees.

5. The vertical take-off or landing aircraft of claim 1, further comprising one or more additional wing supports, wherein the wing is rotatably attached to the additional wing supports.

6. The vertical take-off or landing aircraft of claim 1, further comprising an elongated recess in the wing positioned to receive the wing support.

7. The vertical take-off or landing aircraft of claim 1 wherein the axis is positioned at an angle relative to a longitudinal axis of the aircraft.

8. The vertical take-off or landing aircraft of claim 1 wherein the axis is a first axis, and wherein the wing is further positioned to rotate about a second axis different from the first axis.

9. The vertical take-off or landing aircraft of claim 1 wherein when the aircraft is in the horizontal flight configuration, the wing has an inboard portion positioned proximate to the inboard region and a tip portion positioned distal to the inboard region, and wherein when the aircraft is in the vertical flight configuration, the inboard portion and the tip portion are positioned on opposing sides of the wing support.

10. The vertical take-off or landing aircraft of claim 9, further comprising a fuselage, wherein the inboard portion is a root portion, and wherein when the aircraft is in the horizontal flight configuration, the root portion is positioned adjacent to the fuselage.

11. The vertical take-off or landing aircraft of claim 9 wherein when the aircraft is in the horizontal flight configuration, the inboard portion is positioned adjacent to a fixed wing segment.

12. A vertical take-off or landing aircraft comprising:
a fuselage;
a wing support attached to the fuselage; and
a rotatable wing section having an inboard portion proximate to the fuselage and an outboard portion distal from the fuselage, the rotatable wing section being rotatably attached to the wing support at a wing rotation joint and configured to rotate about an axis between a vertical flight configuration in which the inboard portion is positioned on an opposing side of the wing rotation joint relative to the outboard portion, and a horizontal flight configuration different from the vertical flight configuration;
wherein the axis is oriented along a chordwise direction of the wing section.

13. The vertical take-off or landing aircraft of claim 12 wherein when the rotatable wing section is in the vertical flight configuration, the outboard portion and the inboard portion are located on opposite sides of a center of gravity of the aircraft.

14. The vertical take-off or landing aircraft of claim 12 wherein when the rotatable wing section is in the vertical flight configuration, the outboard portion and the inboard portion are located on opposite sides of the wing support.

15. The vertical take-off or landing aircraft of claim 12, further comprising a landing gear unit attached to the rotatable wing section, the landing gear unit positioned to at least partially support the aircraft on a surface when the rotatable wing section is in the vertical flight configuration.

16. The vertical take-off or landing aircraft of claim 12 wherein the wing support comprises a first wing support and the rotatable wing section comprises a first rotatable wing section, the aircraft further comprising a second wing support attached to the fuselage and a second rotatable wing section rotatably attached to the second wing support, wherein the first and second rotatable wing sections are configured to rotate between the horizontal flight configuration and the vertical flight configuration during flight.

17. The vertical take-off or landing aircraft of claim 12 wherein the rotatable wing section is configured to rotate to an angle between 20 degrees and 160 degrees relative to the wing support.

18. The vertical take-off or landing aircraft of claim 12 wherein the axis is positioned at a distance from an end of the rotatable wing section that is between 10 percent and 90 percent of a length of the rotatable wing section.

19. A vertical take-off or landing aircraft comprising:
a wing support extending from a main body of the aircraft; and
a wing attached to the wing support, the wing comprising a root portion and a tip portion, the wing configured to rotate about an axis between a horizontal flight configuration in which the wing is generally aligned with the wing support and a vertical flight configuration in which the wing is oriented at an angle relative to the wing support; wherein
the axis is oriented along a chordwise direction of the wing, and wherein the root portion and the tip portion are positioned on opposite sides of a center of gravity of the aircraft in the vertical flight configuration.

20. The vertical take-off or landing aircraft of claim 19, further comprising a first propulsion rotor connected to the wing and a second propulsion rotor connected to the wing, wherein the axis is positioned between the first propulsion rotor and the second propulsion rotor.

21. The vertical take-off or landing aircraft of claim 19, further comprising a landing leg attached to the wing and extending toward a tail end of the aircraft, the landing leg positioned to at least partially support the aircraft on a landing surface in the vertical flight configuration.

* * * * *